United States Patent [19]

Decker et al.

[11] Patent Number: 5,229,936
[45] Date of Patent: Jul. 20, 1993

[54] DEVICE AND METHOD FOR THE STORAGE AND RETRIEVAL OF INFLECTION INFORMATION FOR ELECTRONIC REFERENCE PRODUCTS

[75] Inventors: Joseph E. Decker, San Jose; Edward Oswalt, Sunnyvale, both of Calif.; David Justice, Princeton, N.J.

[73] Assignee: Franklin Electronic Publishers, Incorporated, Mt. Holly, N.J.

[21] Appl. No.: 638,067

[22] Filed: Jan. 4, 1991

[51] Int. Cl.⁵ .............................. G06F 15/20
[52] U.S. Cl. .............................. 364/419
[58] Field of Search ................. 364/419, 900

[56] References Cited

U.S. PATENT DOCUMENTS

| | | | |
|---|---|---|---|
| 2,983,904 | 5/1961 | Moore | 340/172.5 |
| 4,420,817 | 12/1983 | Yoshida | 364/900 |
| 4,499,553 | 2/1985 | Dickinson | 364/900 |
| 4,575,798 | 3/1986 | Lindstrom et al. | 364/300 |
| 4,594,686 | 6/1986 | Yoshida | 364/900 |
| 4,724,523 | 2/1988 | Kucera | 364/419 |
| 4,748,589 | 5/1988 | Kanou et al. | 364/900 |
| 4,799,188 | 1/1989 | Yoshimura | 364/900 |
| 4,862,408 | 8/1989 | Zamora | 364/900 |
| 4,864,501 | 9/1989 | Kucera | 364/419 |
| 4,899,149 | 2/1990 | Kahan | 341/67 |
| 4,959,785 | 9/1990 | Yamamoto | 364/419 |

Primary Examiner—Roy N. Envall, Jr.
Assistant Examiner—A. Bodendorf
Attorney, Agent, or Firm—McAulay, Fisher, Nissen, Goldberg & Kiel

[57] ABSTRACT

A method and apparatus stores and retrieves inflected forms of words in electronic reference products and, in particular, in electronic dictionaries, electronic bilingual dictionaries, electronic thesauri and an electronic Bible. The method is for providing inflection information related to a given word in an electronic reference device having a memory portion comprises the steps of providing information representing all of the forms of a word whose inflections are to be considered, forming information representing as stem of the word consisting of the longest prefix that is the same in all of the forms of the word, forming information representing a list of all of the allowed endings, designated as ending sets, of the forms of the word, assigning a unique number to each ending set, storing information representing the stem portion of the word in a memory arranged in a predetermined manner, and storing information representing a sequence of characters in a memory portion corresponding to each ending set number followed by a termination character. The sequence includes characters used to specify the part of speech and grammatical information.

18 Claims, 6 Drawing Sheets

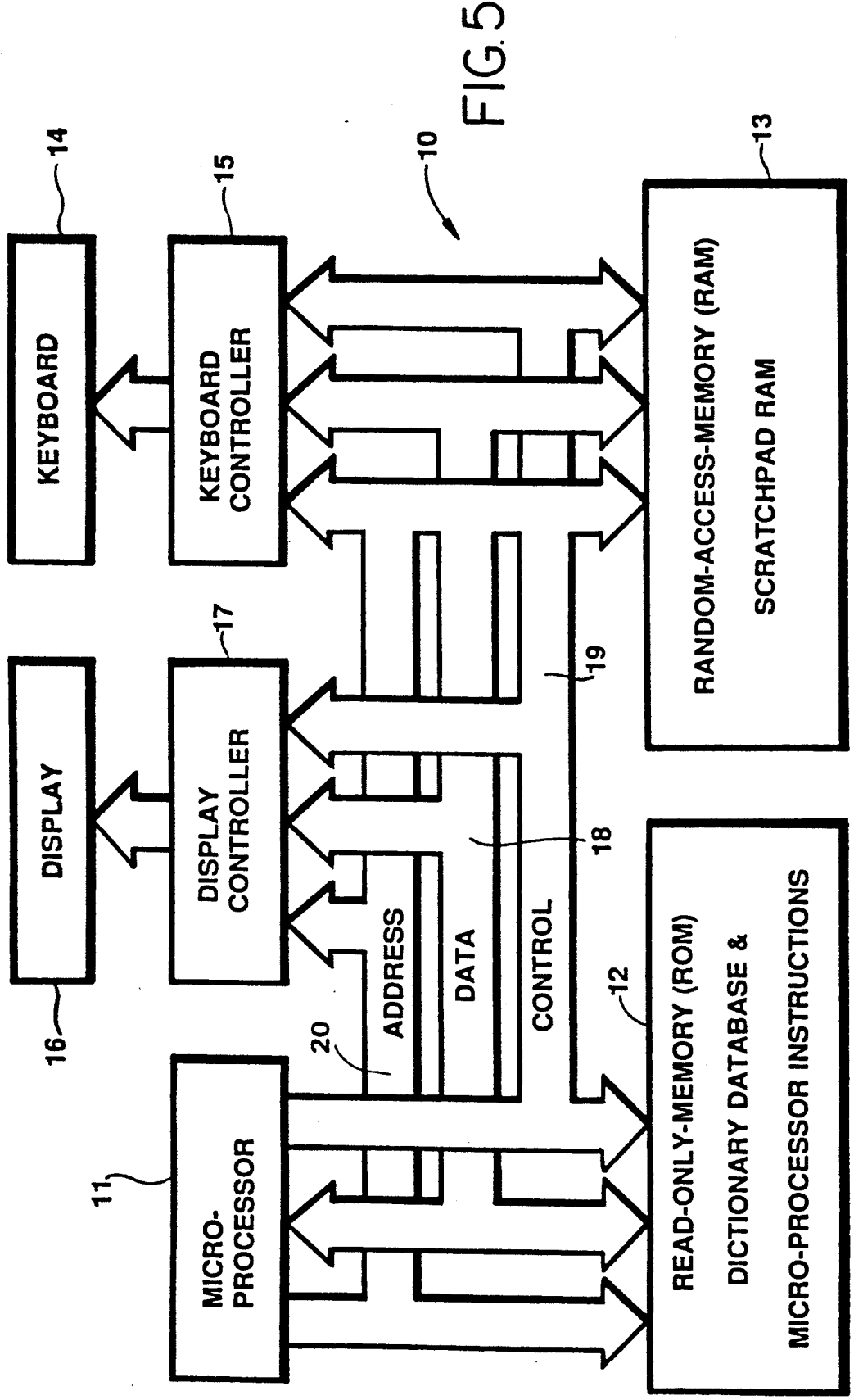

DEVICE AND METHOD FOR THE STORAGE AND RETRIEVAL OF INFLECTION INFORMATION FOR ELECTRONIC REFERENCE PRODUCTS

BACKGROUND OF THE INVENTION

1. Field of the Invention

The present invention relates to a method and device for storing and retrieving inflected forms of words in electronic reference products and, in particular, in electronic dictionaries, electronic bilingual dictionaries, electronic thesauri and an electronic Bible. In a particular form of the invention, the storing and retrieving of inflected information in an English/Spanish electronic dictionary is encompassed.

2. Inflected Forms of Language

Inflected forms of a word encompass all of its variations in usage. Examples of inflected forms are the plural forms of English nouns, the comparative ('er') and superlative forms ('est') forms of English adjectives, the past tense of English verbs, and so on. Different languages inflect differently. English typically only distinguishes between 5 different forms of a verb (infinitive, past, past participle, present participle, 3rd person singular), whereas Spanish verbs have about 50 different forms.

More specifically, the different forms of green are green, greener and greenest. The forms of go are go, went, gone, going, and goes. The forms of play are play, played, playing and plays. (Note that different forms of a word may overlap). Also, some words may not allow certain forms. The forms of 'mere' are 'mere' and 'merest'; there is no 'merer' (meaning more 'mere').

3. Background Prior Art

Certain known electronic reference products utilize a technique to store words called the directed acyclic word graph (DAWG). Such technique is described in the article "Sorting and Searching", Vol. 3 of the series, "The Art of Computer Programming", by Donald Knuth, 1973, Addison Wesley (p. 481 ff.). While Knuth uses the term, "trie", the term DAWG is now standard. Such DAWGs have been used to store certain word-related information in the past. The present invention uses the DAWG structure as a starting point, but modifies it in a number of unique ways to provide the ability to store and retrieve inflected information.

OBJECTS OF THE PRESENT INVENTION

1. An object of the present invention is to provide a method and electronic reference device for storing a large number of words with their inflected forms in a small amount of space.

2. Another object of the present invention is to provide such method and device which stores the inflected forms in such a way that certain operations (such as trying to find out whether a word form is in the data, performing spelling corrections, etc.) can be performed relatively quickly. These operations include searching for a word given its spellings, searching for words with similar spellings to a query, searching for words with a given (user provided) prefix, etc.

3. Still another object of the present invention is the provision of a method and electronic reference device which can be used to find the "root" (or "base" or "citation") form of a word. That is, one can determine that the root form of greener is green. This allows devices such as electronic dictionaries, thesauri, and translators to take a word entered by a user (say "greener"), map it to that word's "root" form ("green"), and then look up in some other database the appropriate dictionary, thesaurus or translator article on the word filed under "green".

4. A still further object of the present invention is the provision of a method and electronic reference device to determine the specific type of the inflection. For example, the method and device can be used to determine that "greener" is the comparative form of "green".

5. A yet additional object of the present invention is the provision of a method and electronic reference device for determining the spelling of specific inflections of a word. For example, it can be used to determine that the comparative form of "green" is "greener". (Compare with (4)).

6. Yet another object of the present invention is the provision of a method and electronic reference device for determining and displaying inflection tables, similar to conjugation tables one might find for irregular verbs in foreign language textbooks:

For Example:
verb = go
    infinitive = go
    past tense = went
    past participle = gone
    present participle = going
    3rd person = goes 7. Still an additional object is the provision of a method and electronic reference device which can store or retrieve the part of speech and other grammatical information that apply to all the forms of a word. (Note the careful use of a word to actually apply to more than a single spelling... "go", "went", etc. are all forms of the word "go". Accordingly, the method and device could store the fact that "go", is a verb, or that "mano" is a (Spanish) feminine noun.

8. A still further object of the present invention is the provision of a method and electronic reference device for providing superior translations to those given by existing machines because a translation device could use the above steps in a way best explained by the following example:

A user enters the word boys.

By object (1), the method and device verifies that 'boys' is a word that appears in the dictionary.

By object (3), the method and device determines that the root form of 'boys' is 'boy'.

By object (4), the method and device determines that 'boys' is the PLURAL of 'boy'.

Now the device examines its information for the word boy as would happen in a normal translation device, and determines that the translation of 'boy' is 'muchacho'.

By object (5), the method determines that the plural of 'muchacho' is 'muchachos'. This form is output.

This is a simple example. As described above, different languages follow different inflectional patterns. Spanish adjectives have different forms based on whether the noun that's modified by the adjective is singular or plural, and whether the noun is masculine or feminine. In English, these inflect only to indicate 'more' or 'most'. In this case, the inventive method cannot do anything to help. Sometimes a single form in one language might correspond to a subset of the forms in the second, in that case it would be possible to use the method to describe the different alternatives.

9. Still another object of the present invention is the provision of a method and electronic reference device for storing variant spellings of the different forms. For example, the noun abacus has two plural forms, abaci and abacuses.

10. Yet another object of the present invention is the provision of a method and electronic reference device for performing searches for words that have similar inflection patterns which might be useful as a learning aide.

11. An additional object of the present invention is the provision of a method and electronic reference device which can provide indicators inside of a DAWG structure.

SUMMARY OF THE INVENTION

In accordance with the invention, a method for providing inflection information related to a given word in an electronic reference device having a memory portion comprising the steps of providing information representing all of the forms of a word whose inflections are to be considered, forming information representing a stem of the word consisting of the longest prefix that is the same in all of the forms of the word, forming information representing a list of all of the allowed endings, designated as ending sets, of the forms of the word, assigning a unique number to each ending set, storing information representing the stem portion of the word in a memory portion arranged in a predetermined manner, and storing information representing a sequence of characters in a memory portion corresponding to each ending set number followed by a termination character, the sequence including characters used to specify the part of speech and grammatical information.

For a better understanding of the present invention, reference is made to the following description and accompanying drawings while the scope of the invention will be pointed out in the appended claims.

BRIEF DESCRIPTION OF THE DRAWINGS AND APPENDIX

In the drawings:

FIG. 5 is a block schematic diagram of an electronic reference device of the present invention.

Figure 4:
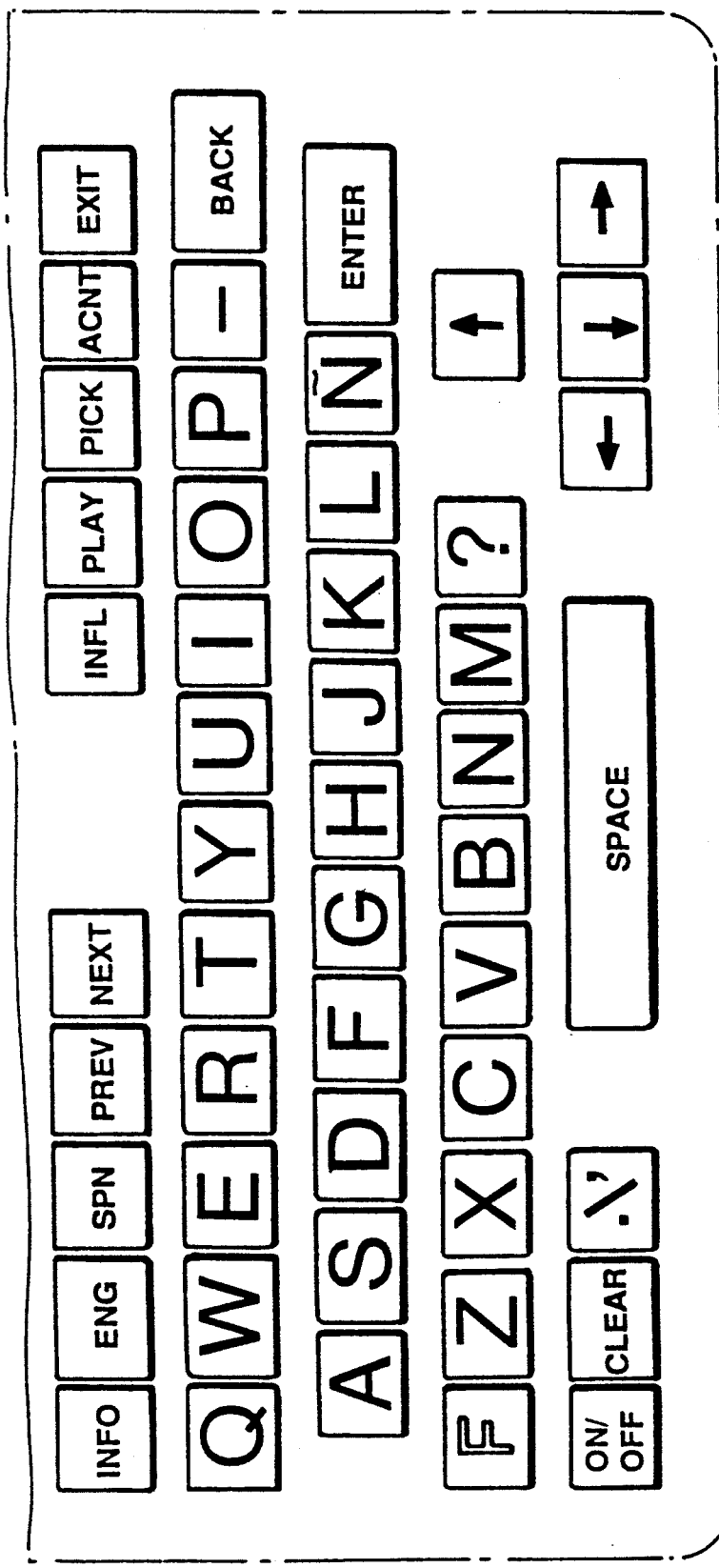
FIG. 4 is a top view of a keyboard and display of a bilingual dictionary for use with the method of the present invention.

The Appendix (in four parts) are program software listings of a portion of an electronic device as in FIGS. 4 and 5 relating to provide inflection information in accordance with the present invention.

GENERAL DESCRIPTION OF THE INVENTION

As mentioned above, the present invention begins with the DAWG. This structure is modified, however, in a few unique ways. First, and most importantly, the DAWG is not used to store word forms as a whole. Instead, something more complex is done. Initially, all of the forms of a word are considered and the question is asked "What is the longest prefix of all of these forms that is the same in all of the forms?" For example, for the word 'abacus' (plural form 'abaci' or 'abacuses'), the longest such prefix is 'abac'. This prefix is called the 'stem' of a word.

Then another mechanism is used to encode a list of the allowed endings, which forms they are, and also the part of speech and grammatical information referred to in object (7). For a set of forms of a single word, this information is called the 'ending set'.

So, the noun 'abacus', which has plurals 'abaci' and 'abacuses' is separated into two parts, the stem and the ending set.

| stem | ending set | |
|------|------------|---|
|      | (noun)     |   |
| abac- | -us       | (singular (base)) |
|      | -i         | (plural) |
|      | -uses      | (plural, alternate) |

The above diagram is meant to explain the very odd use of 'stem' and 'ending set' in this explanation, not as a schematic of how the information is/should be stored.

One finds that in many Indo-European languages the number of distinct ending sets in a language is small (compared to the number of distinct words). Therefore a table is made of the different ending sets that can occur, and numbers are assigned to them. Say that the ending set contains the information above is numbered 44. If we have the table, the word 'abacus' can be described by two pieces of information:

stem: abac-
ending set #: 44

Now, returning to the previous discussion of DAWGs, only the stem of the word 'abac' is inserted into the DAWG, and the "ending set number" is stored with that word as mentioned above in the paragraph.

The ending set table storage may be described as follows: Each ending set number corresponds to a sequence of symbols in the computer memory (characters) ended by a termination symbol. Also introduced is another special symbol which is called the separator symbol, and later will be discussed two more special symbols, the variant separator symbol and the 'no-such-form' symbol.

In the present method, the first symbols of the string are used to specify the part of speech (POS) and grammatical information stored in this ending set, in the example, the fact that this is a noun.

The exact storage of this information could be done in several ways; two are worth noting, 1) One can encode POS/grammatical information using a standard computer character encoding (such as ASCII, EBCDIC etc.). In this case the information would occupy a fixed number of symbols or would include all characters up until the use of a special symbol, perhaps the separator symbol.

2) One can encode POS/grammatical information by using symbols representing the address of such information stored elsewhere in memory, or as an index into a table of such information. For example, if one has a table of the form:

1 noun
2 verb
3 adjective

Only the symbol 1 might need to be stored in a computer.

Now a list of word suffixes, and their type must be stored. The important thing to note here is that, for a specific language and a specific part of speech, there will be a small set of form types that word might take. For an English noun, there is the singular (base) form, and the plural form.

So, for each pair of language and POS, a specific ordering of forms is defined. As an example, for English nouns, one could pick the order singular, then plural. It is useful to have the base form always come first. Then the suffixes are simply listed after the grammatical/POS information, separated by "separator" symbols.

The following is a quick example. "Boy" is a noun. The plural of boy is "boys". Therefore, the stem is "boy", the singular ending is "" (empty), the plural ending is "s". Using | to represent the separator character and ! for the termination character, a bend might be represented this way: noun||s!

Two further details must be considered. It is wished that these forms be stored in a predefined order so that it is known that the 2nd form of a noun is a plural, etc. A variant separator character is introduced to separate different spellings of the same form type of a word.

For example: abacus has two plurals "abaci" and "abacuses". Using '+' as the variant separator character, the ending set for abacus might be: noun|us|i+uses!

Also, some words do not have certain forms, as in the 'mere' example above. The ending set for that uses a 'no such form' symbol, which will be represented by the # character. Here, mere is the stem, and the ending set is: adjective||#|st! so the spelling of the first form type of "mere" is "mere", there is no word of the second form type, and the spelling of the third form type is "merest".

It has also been found useful to create a table of information, indexed by the bend number, which indicates quickly whether or not an ending set contains an empty suffix, that is, whether the stem is by itself a form of the word. This allows for significant performance enhancements in performing such functions as spelling correcting.

INFLECTION INTERFACE FOR ELECTRONIC DICTIONARIES

A direct mechanism in the English-Spanish bilingual dictionary for exploring the inflections of English and Spanish verbs, nouns and adjectives is provided by the invention.

In addition to a standard alphanumeric keyboard, see FIG. 4, (extended in this case to include the Spanish N-with-a-tilde character and an key marked ACNT to allow the entry of characters with an accent), 4 keys marked with arrows, one each pointing left, right, up and down are also provided. Function keys which are also relevant are provided labelled NEXT, PREV, INFO, INFL and EXIT.

When a word is entered, the user may press INFL immediately to "enter" the inflection table for that word. Alternatively, they might look up a translation dictionary entry for a word, or select a word from the screen using another mechanism, but in any case, they then press INFL.

At this point they see some or all of the inflected forms for the chosen word, in the context of prewritten 'templates' which give the user a clue as to what inflection is being shown without the use of complex grammatical terms.

I go; he goes (today)
I went (yesterday)
I have gone (recently)
I am going (tomorrow)
(Obviously the set of applicable templates for a word depends on the part of speech of that word and which language that word came from.)

In one bilingual Spanish/English embodiment, the parenthesized material is actually written in Spanish, since this information (for an English word such as go) is of particular importance for a native Spanish speaker learning English.

Here, the words "go", "goes", etc. are actually retrieved from the previously described storage mechanism, the template simply refers to "form numbers" (1=infinitive, 5=present participle, etc.) and the software contrives to replace the specially marked number with the appropriate form of the word being inflected.

Because some words are long, the completed templates may extend beyond the right edge of the display, the user is allowed to scroll left and right using the left and right arrow keys to see this information.

Sometimes there is more information to give than could fit on a single screen. This is the case with Spanish verbs, where over 70 different uses of over 50 different verb forms must be explained for each verb. The user is allowed to repeatedly press the INFL key to cycle through this information. NEXT acts like INFL in this regard, and PREV cycles through the screens in the opposite order—in case one goes too far.

With each template is an associated explanation of the forms shown in the template. The explanation is always written in the "other" language—Spanish if the user is looking at an English word, and vice versa.

These explanations can require more lines of text than will fit on the display device, so the user is allowed to press the up/down arrow keys to scroll the explanation up or down. The user can see the explanation for a template by pressing the INFO key, and return to the template by pressing the EXIT key.

ACCENTED CHARACTER INPUT METHOD

Existing computers and electronic devices allow the user to enter accented characters in one of two ways. First, they may provide a special key for each such character (as in the French keyboard for the IBM-PC). Second, they may provide a key which puts the device into a mode which allows the user to enter two more keystrokes, typically the first one being the character as it would be typed without the accent, the second being a punctuation symbol similar to or indicative of the accent mark being typed. The Sun Microsystems Type 4 keyboard uses this method, to enter an "a" with an acute accent, one presses the "Compose" key, then the "a" key, then the apostrophe key.

In accordance with the present invention, a 'cyclic' accent key is provided. To enter an accented letter, the user presses the unaccented letter, then repeatedly presses the cyclic accent key. Each time the key is pressed, a different accent appears over the letter. (The unaccented version is included in the cycle.) Only accents which are sensible in the context of the device need be included in the 'cycle'.

So, for the present device, if one is entering a Spanish word, and one wants to enter a-acute, one presses a, the letter a appears, then one presses the accent key, and an acute accent appears over the a. If the accent key is pressed again, the accent goes away. If u is entered and the accent key is repeatedly pressed, the u would change to a u with an acute accent, then u with a diaeresis, then unaccented, and so on.

On small keyboards, such as those often found in handheld electronic devices, this is particularly handy since it doesn't require punctuation characters or extra keys for the individual accented characters.

On large keyboards this still keeps the keyboard smaller than if all the accented letters had special keys—but requires less keystrokes than the "Compose" mechanism.

BILINGUAL DICTIONARY WITH SYMMETRIC INTERFACE

It is believed that all bilingual dictionaries currently only provide screen prompts, help screens and similar information in one language. It is believed that there are good reasons for providing this information in both languages, along with a switch or two allowing the user to choose which language these things should be displayed in.

First, it allows the device to be used by native speakers of different languages.

Second, it allows an intermediate or advanced speaker of a second language to switch to a different language, providing a small amount of additional practice in the foreign language. Foreign language classes are often held in that language to keep "on the track" of that foreign language, the same logic would seem to apply to electronic bilingual dictionaries.

DETAILED DESCRIPTION OF THE PRESENT INVENTION

As stated previously, when it is desired to store a word, its part of speech, and its inflections in the diagram and table, that information is divided into two parts, the 'stem' and the 'ending set'.

An example will make the meaning of these two terms clear. For the word "sing", a verb, the stem is "s", and the ending set contains both the fact that the word in question is a verb, and that "ing" is added to the stem to form the infinitive form of the word, "ings" is added to form the third person singular indicative, "ang" is added to form the past tense, "ung" is added to form the past participle, and "inging" is added to form the present participle.

Figure 1:
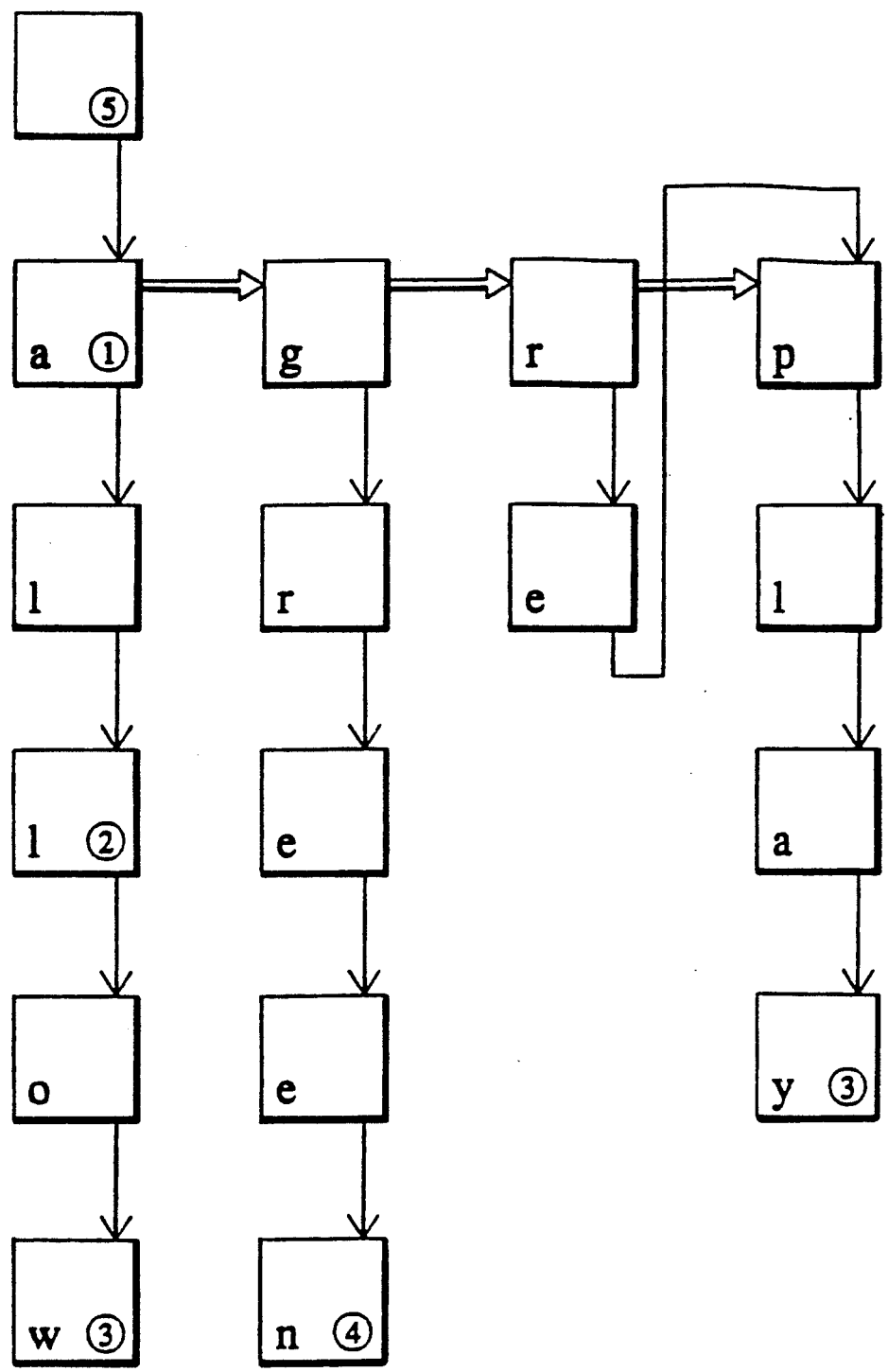
FIG. 1 represents, in block diagram form, a directed acyclic word graph (DAWG) used to store the stems of words in accordance with the present invention.

In a representative diagram the ending set with a string is indicated by parts separated by the "|" character. The first part is the part of speech, the remaining parts (if any) are the different endings. For "sing", the ending string as shown in FIG. 1 would have been:

verb|ing|ings|ang|ung|inging|

The order of the inflections is considered to be implied by the part of speech. So in the previous example, since that is a "verb", the fourth field "ang" must be the ending of the past tense of the given verb.

The stem may be empty, as is the case with the word "go". The stem is always chosen to be the longest left common substring of all of the inflected forms of a word.

Now referring to FIG. 1, the top diagram in FIG. 1 represents a directed acyclic word graph (DAWG) used to store the stems of words. At the end of each stem, there is an index into the table of ending sets (shown below the main diagram). These indexes are represented as circled numbers in FIG. 1.

To read the DAWG, start at the top square. A string is built the 'path string' that will start off being empty at this top square. If one follows a dark 'down' arrow, add the letter in that box (node) to the string one is building. If one follows a light 'right' arrow, one replaces the last letter of the string one is building with the letter in that node. When one reaches a node with a circled number in it, the string now is the stem of some word. The number in the circle is an index into the table at the bottom of FIG. 1, which gives the ending set for the word in question.

Since more than one word may have the same stem, it is possible for a node to have more than one index into the ending table.

So, we can see that the ending set 5 applies to the empty stem, the ending set 1 applies to the stem "a", the ending set 3 applies to the stems "allow", "play" and "replay", and so on.

The distinction of the present invention from prior art is the cleaving of words, their part of speech, and their inflections into 'stems' and 'ending sets' and the associated mechanisms that make this useful.

Operations on such a DAWG, such as determining whether a string is represented in the DAWG, are normally performed by a depth-first search, a standard programming technique. In such a search, every path from the top of the DAWG to a node is traversed, with paths 'down' from a given node being searched before path 'right' from that node.

Such a search, applied to FIG. 1, would visit nodes in the following order:

| Node | Value of the 'path string' |
|---|---|
| The top node with a circled 5 | "" |
| The a node with a circled 1 | "a" |
| The l node below that | "al" |
| The l node with a circled 2 | "all" |
| The o node | "allo" |
| The w node with a circled 3 | "allow" |
| At this point, the method realizes it can go 'down' no further and tries to find a route to the 'right'. So it backs up to | |
| The o node | "allo" |
| The l node with a circled 2 | "all" |
| The l node above that | "al" |
| The a node | "a" |
| [Finally, it can go 'right'] | |
| The g node | "g" |
| [Now it can go 'down' again . . . ] | |
| The r node | "gr" |
| . | |
| . | |
| . | |

This process continues until the method returns to the topmost node. Whenever a circled number is encountered (except when backing up), one has reached the end of a valid stem. A variation of this method is used to determine the presence or absence of specific words in the structure. The process is the same, except that at each step, one compares the path string against the word one is searching for, up to the number of letters in the path string. If a difference is found, there is no point in checking for a word farther 'down' in the DAWG.

For example, if one is at the "r" below the "g" in FIG. 1, and one is looking to see if the word "gas" is in the data structure, one need not continue any farther 'down' from "gr", since any words 'below' "gr" will start with "gr", and therefore not with "ga" as in "gas".

A key property of the invention is that it allows us to perform operations analogous to the 'down', 'right', and 'up' operations demonstrated above within the ending strings as well as in the stems. A number of different functions operating on wordlists can be described in terms of these three primitives. These functions include:

determining whether a word is in the data structure;

determining all words in the data structure which begin with a given prefix;

determining all words in the data structure which match a 'regular expression' ["The Design and Analysis of Computer Algorithm", by Aho, Hotcroft, Ullman, chapter 9, pp. 317ff. 1974, Addison Wesley];

spelling correction from a query to a set of words from the data structure.

Figure 2:
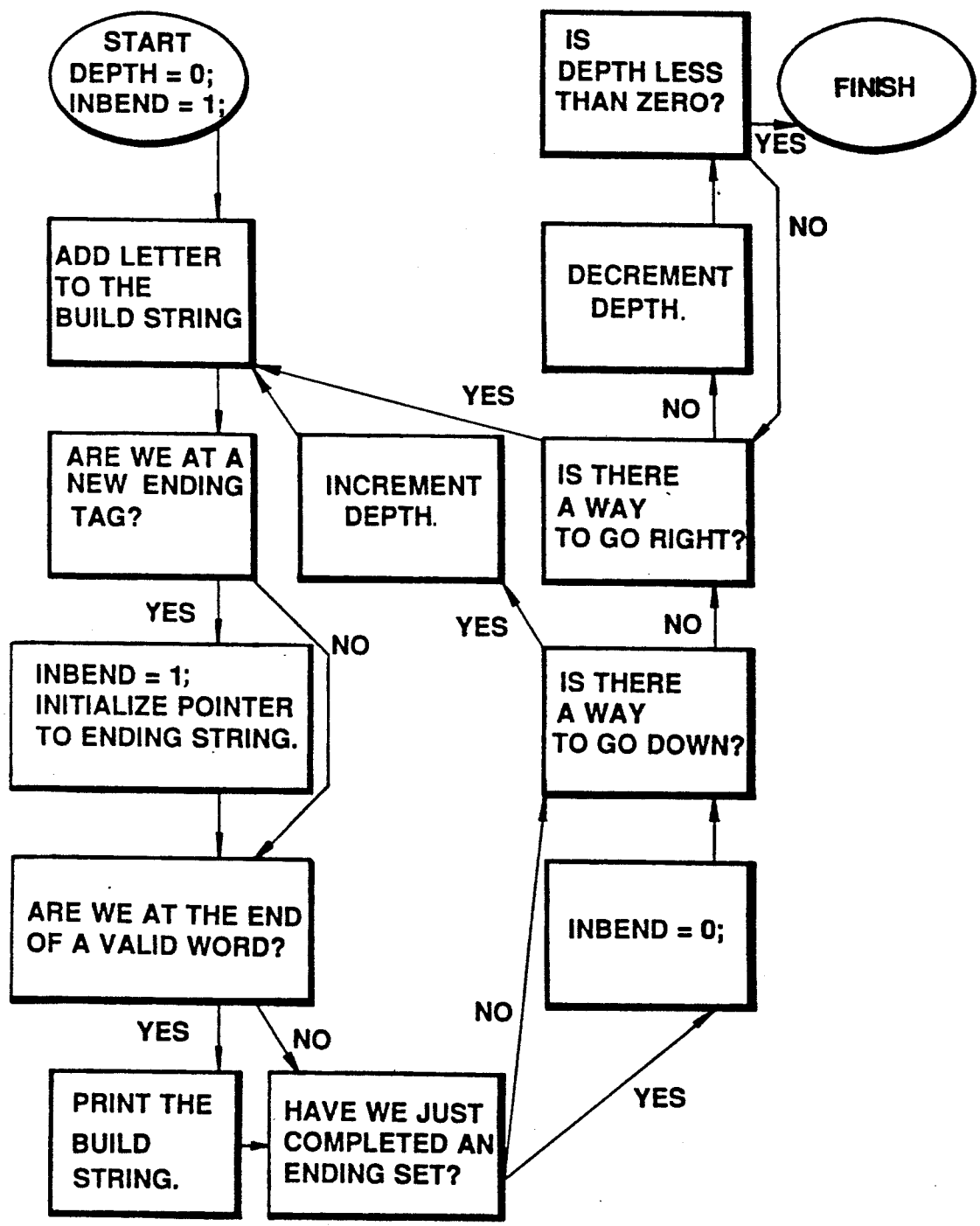
FIG. 2 is a flow diagram of a complete traversal on the data structures of the method for storing inflection structures of the present invention.

An overview of the extended depth-first technique, which includes traversing ending sets, is shown in FIG. 2. While this example involves only printing out the words contained in the data structure, it would be easily modified by those skilled in the art to perform many of the above operations.

Two new variables are introduced to the depth-first technique shown above. Inbend is 1 if we are 'in' an ending set, 0 otherwise. Depth refers to the offset into the path string being operating on, that is, when we go 'down', depth is incremented, when we go 'up', it is decremented.

The traversal initially begins like a more typical depth-first traversal Differences begin the moment we reach a node which has an ending set index. At that point, jump (along the path labelled Yes) to the state that begins "inbend=1;". This indicates that we are maintaining a flag variable which is 1 when we are 'within' an ending set.

In the example of FIG. 1, one reaches this case immediately, with the path string being empty and the ending set tag being 5. While inbend is 1, we initialize a pointer which starts off pointing to the first letter of the first ending in the ending set, in this case, the first g in:

verb|go|goes|went|gone|going|

(At this point in the traversal, the part of speech may be stored, it will apply to any spelling generated while inbend remains set at 1.)

When a pointer is at a letter, searches are allowed to go 'down' from that letter, or 'up', but not right. If the search proceeds 'down', the method acts as if the user had found a node in the DAWG 'down' from the current node, containing the letter that is pointed to by the ending string pointer. If the character after that is a |, it is known that the path string is a valid word, that is, a word stored in the data structure.

EXCEPTION: when one first enters an ending, it is possible that there is a null ending in the ending set later on. While it is possible to search the string for this indication when one finds an ending set tag, it has been found more desirable to maintain a separate table, one bit per ending set, of whether an ending set contains a null ending. This allows the method to quickly distinguish those path strings which should be recognized as 'words' in the storage mechanism.

If the search proceeds 'up', we skip the ending string skips forward ahead to the next '|' character. We then only allow 'up' operations until depth reaches the level at which the ending set is entered. Then the method advances to the next character (the first character of the next ending), and allow the user to go 'down' from there.

When the end of the ending string is reached, only 'up' operations are allowed until the method returns to a node actually present in the DAWG, and then continues normally.

Such a search on FIG. 1 would print out these words in this order:

go, goes, went, gone, going, a, all, allow, allows, allowed, allowing, green, greener, greenest, replay, replays, replayed, replayed, replaying, play, plays, played, played, playing.

Actual storage mechanisms:

During traversal, ending strings are represented in the computer's RAM as a sequence of bytes, each byte indicating a character, a special symbol (for example, the '|') or a NULL byte, indicating the end of the string. However, in some applications, these strings may be compressed using standard techniques (multigramming, Huffman coding) and placed in ROM, with a copy of that ending string in the above format only being created when necessary.

DAWG representation has been studied greatly, so there are numerous possibilities for the representation of DAWGS. Typically, nodes are presented by contiguous portions of memory. Arrows are often implemented by indicating the relative address of the thing pointed to with respect to the beginning of the DAWG, or the thing pointed from. Also, there may be flags that indicate that the down or right arrow points to a portion of memory adjacent to the current node. It is even more common to see several such techniques in use within the same DAWG.

Some extensions:

1. Another symbol can also be introduced into the ending sets (denoted by "@") which denotes the lack of a particular type of inflection. While the word "green" has a comparative "greener" and a superlative "greenest", one word, "mere" has a superlative "merest" but no comparative. That is, "merer" is not a word. In this case, it can be represented with a stem of "mere" and an ending set string of adjective||@|st|

This is more compact than the previous description, which would force the use of an empty stem and an ending set string of adjective|mere||merest|

2. Another symbol can be introduced (denoted by "+") to handle alternative spellings of words. For example, the word color might be denoted with a stem of "colo" and a ending set string of:

noun|r+ur|rs+urs|

The method processes +exactly as "|" except when trying to determine what type of inflection a given ending refers to. Thus, this allows us to note that "color" and "colour" are singular nouns (the same inflection).

3. Another symbol can be introduced to handle repeated form endings. If we denote that symbol by "#", then ending string 3 from FIG. 1 becomes:

verb||s|ed|#|ing|

This affords only a tiny bit of extra compression, however, this symbol can be specially recognized by some depth-first methods to obtain greater speed. For example, consider a spelling correction technique, trying to correct a user's query to some word form in the data structures. Such a technique might very well skip over such repeated endings, knowing that it had already examined that particular spelling.

In summary, the invention provides the following advantages:

1. Because an ending set string needs to only be stored once in all of these cases, the resulting data structures are compact and therefore require smaller memory devices for their storage.

2. Operations mentioned above (especially spelling correction) are fast when implemented on such data structures.

3. One can determine the part of speech and inflection type for a word quickly and easily.

4. One can determine all the inflections of a word quickly and easily.

5. In a bilingual dictionary or thesaurus, it would be possible to provide improved results using the above benefits. For example, a user searches on such a thesaurus for a synonym of "guys". Normally, such searches would fail, since only "guy" and not the plural would be stored. However, with the addition of our invention, the thesaurus could see that "guys" was the plural of "guy", note that "boy" was a synonym for "guy", reuse our invention to discover that "boys" was a synonym for "guys", and return "boys".

6. As a learning aid, it would be possible to search for all words that had a specific inflection pattern. For example, since "allow" has ending set number 3, it would be possible to search the data structure for words with ending set number 3, in this case "play" and "replay". Thus, the user could be told that "allow" conjugates like "play" and "replay".

7. It is possible to assign a unique number to each word in the device, simply by counting during a full depth-first traversal of the data structure. In this case, "set" would be assigned the number 1, "a", the number 2, "all" the number 3, and so on. Individual inflections can be expressed as an ordered pair of numbers, e.g., (4,2) could indicate the 2nd inflection of the 4th word, in this case, "allows". Without the addition of the invention, each inflected form would have had to receive its own number. This change has two practical benefits for electronic dictionaries, thesauruses, and so on.

First, since those products often consist of an 'entry' for each word, not each inflection, it is useful to have a correspondence between these numbers and the various entries. In this case, the numbers could be used as an index into the entries. So, the user would type in "allows", convert to an ordered pair (4,2), and the product could display the fourth entry.

Second, the maximum single number produced by this is smaller using the invention. In the example given in FIG. 1, the word enumerations range from 1 to 7. Without the invention, they would range from 1 to 25. References to these numbers are a very convenient method for compressing text. The string "all green replays set" could be encoded as (3,1) (5,1) (7,2) (1,1). Since these numbers are smaller, they can be stored in fewer memory bits. Also, in many applications, the inflection number may be implied by the context. For example, in a dictionary, the bold word at the beginning of a dictionary entry will almost always be inflection number 1 of some word. Therefore, there is no reason to store the form number at all.

STORAGE OF TRANSLATION STREAMS

The text of the bilingual dictionary embodiment of the invention, i.e., source language words and phrases, target language translations, and associated information on usage, etc., is stored as two streams of encoded data, one for English→Spanish translations, and one for Spanish→English translations.

The translation information for a particular request from the user of the device is obtained by:

1. Using the DAWG to find stem numbers associated with the user's request.

2. Using tables to turn this list of stem numbers into a list of pointers into the appropriate stream of encoded data.

3. Decoding information starting at points specified by each of said pointers.

Elaborating on (3), the process of decoding information, requires specifying the structure of the translation streams, each of which is four separate Huffman streams which have been merged into one.

Huffman coding, as discussed above, is a well-known method for encoding a stream of symbols, such as symbols representing words in text, into a stream of variable length codes (which is called a Huffman stream). (See D.A. Huffman, "A Method for the Construction of Minimum-Redundancy Codes," Proceedings of the IRE 40, pages 1098-1101, 1952). The Huffman stream has the shortest length of any bit stream which can be decoded to give the original stream, provided that the only information used in deciding how to assign codes to the original symbols is the frequency of occurrence of the original symbols.

It has been proposed to use multiple Huffman streams in dictionary compression. Reference is made to the application Ser. No. 07/601,268, filed Oct. 22, 1990, by Mark Heising entitled "Method and Apparatus for Compressing a Dictionary Database" and assigned to the same assignee as the present application. Each separate stream, which is called a substream, stores a different type of dictionary information. The use of substreams allows for code assignments based on conditional probabilities: the frequency of occurrence of a symbol given its function in the entry, rather than simply its frequency of occurrence in the stream overall. This has the advantage that the sum of the lengths of the separate encoded substreams is normally much smaller than that for a single encoded stream. There are, however, disadvantages to this approach.

In this system there are four substreams:

1. Control words: These indicate what types of information are stored for each translation. For example, one bit specifies whether the translated item is specifically stored or whether it is the same as in the previous translation; another bit specifies whether the part of speech is shown or whether it is the same as in the previous translation; two bits specify a count of meaning indicator notes, another bit indicates whether grammatical information on the translation is shown, etc.

2. Parts of speech: These indicate the part of speech of the item being translated, for those items which a control word which specifies that this information is present.

3. Stem and special numbers: The stem numbers, with a corresponding form number in substream (4), specifies a particular word. Also in this stream are other numbers which may specify punctuation symbols, the end of a field of data (such as the item being translated), or the fact that the word in the present position may be derived from context.

Figure 3A:
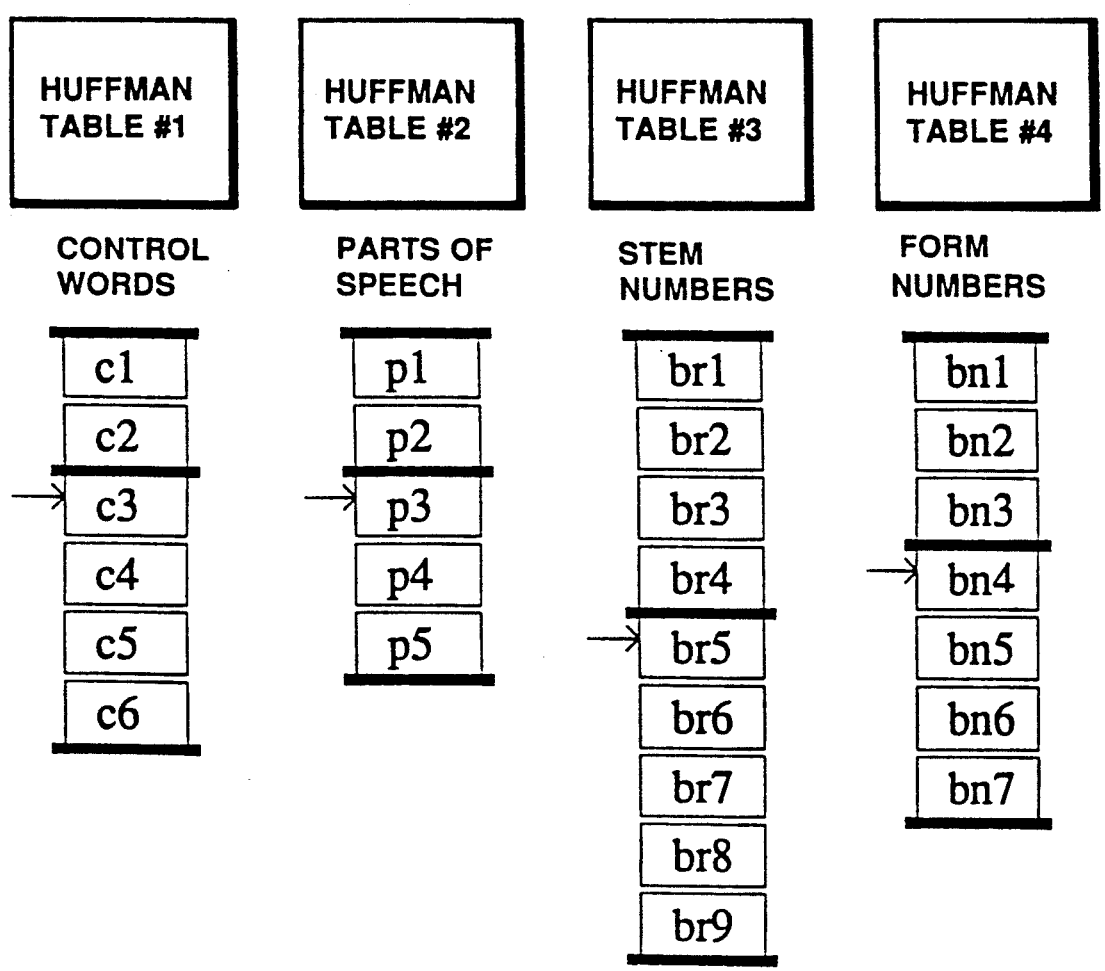
FIG. 3a is a diagram of the structure of (unmerged) Huffman streams used in storage of translation data.

4. Form numbers: These specify forms. Each, with a corresponding stem number in substream (3), specifies a particular word. FIG. 3a shows the portions of the four separate streams of dictionary information for two words in the source language. since there are five control words, there are five translations for these two words. Note that there are fewer parts of speech than control words, since some parts of speech are shown by the control words to be the same as for the previous translation. Note also that there are fewer items in the form number stream as in the stem number stream, since the stem number stream also includes some special numbers as mentioned in (3) above. Each substream is associated with a separate Huffman table, indicating that each stream is encoded with a Huffman code designed specifically to minimize its encoded length.

Figure 3B:
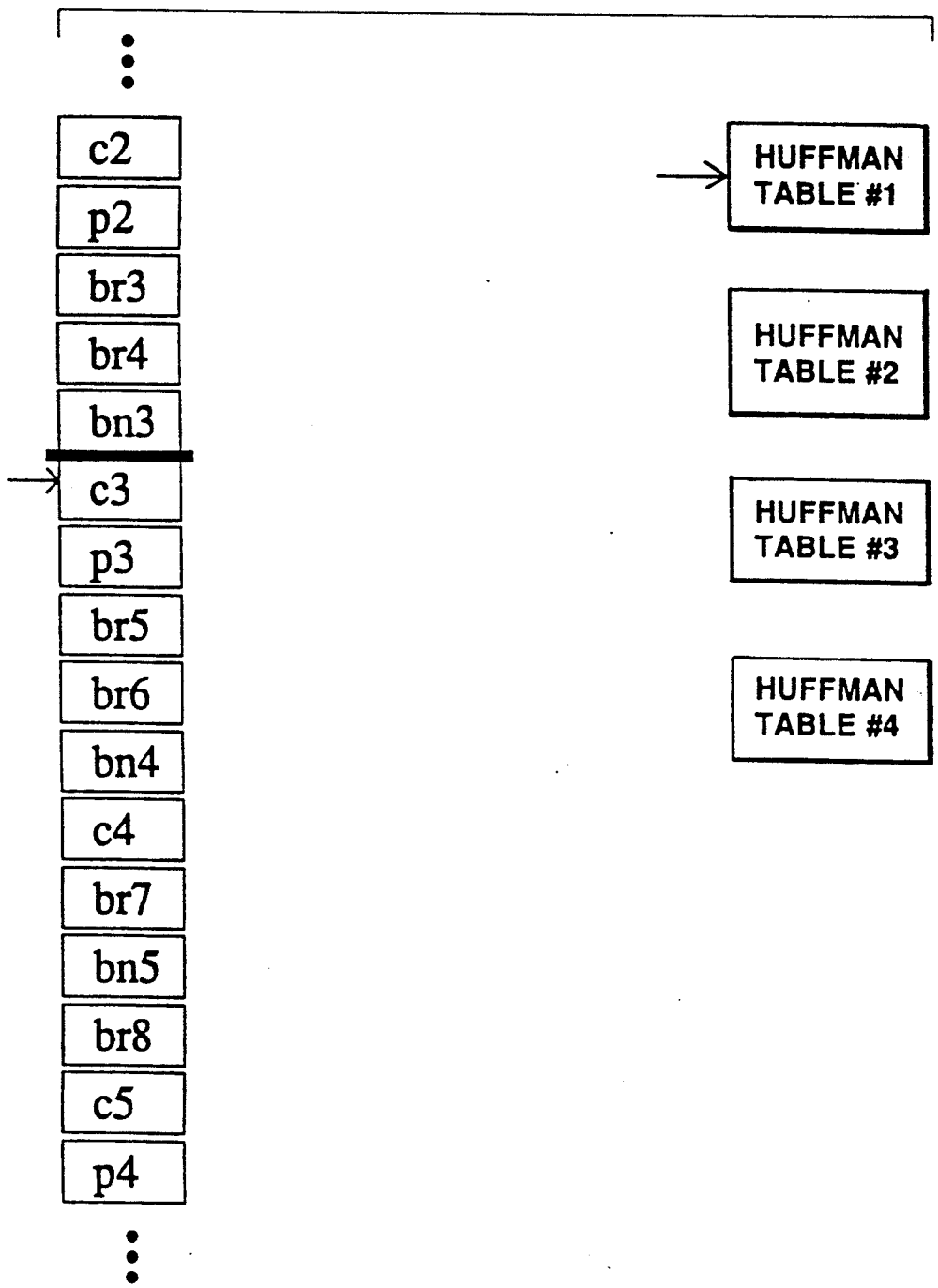
FIG. 3b is a diagram of the structure of (merged) Huffman streams used in storage of translation data.

FIG. 3b shows the substream items shuffled to appear in a single stream in the order in which they are decoded. The four Huffman tables remain the same as in 3a; the information required to select the appropriate table for each encoded item is derived from context.

Among the innovations of the present invention beyond those previously proposed are:

1. In this invention the code for each word is stored as a 'stem' number and a 'form' number, and that these numbers are in fact assigned codes in different Huffman streams.

2. The substreams are merged into a single stream, so that symbols occur in the merged stream in the order in which they are required to produce decoded output, regardless of which substream they occur in.

Innovation (2) above eliminates two of the disadvantages in having substreams:

1. Only one register is needed to store pointers to the current decoding location in the stream, rather than one for each substream.

2. To find locations within each substream from which to begin decoding to produce desired output, no ROM is needed to store offsets into the substreams beyond that which is required for a single stream.

FIG. 5 illustrates, in block diagram form, the basic elements of an electronic reference device 10 for application of the present invention. The device includes a microprocessor 11, a ROM which incorporates the database and instructions as well as the inflection data, DAWGS, etc., a random-access-memory (RAM), a keyboard 14, a keyboard controller 15, a display 16, and a display controller 17. Buses for data (18), control (19) and addresses (20) interconnect the various elements.

While the foregoing description and drawings represent the preferred embodiments of the present invention, it will be obvious to those skilled in the art that various changes and modifications may be made therein without departing from the true spirit and scope of the present invention.

What is claimed is:

1. A method for providing inflection information related to a given word in an electronic reference device having a memory portion comprising the steps of:

providing information representing all inflected forms of a word which are to be considered, said inflected forms including allowed endings of said word;

forming information representing a stem portion of said word consisting of a prefix which is longest and is the same in all of said inflected forms of the word;

forming information representing a list of all allowed endings, designated as ending sets, of said inflected forms of the word;

assigning a unique number to each ending set;

storing information representing said stem portion of the word in a memory portion arranged in a predetermined manner; and storing information representing a sequence of characters in a memory portion corresponding to each ending set number followed by a termination character, said sequence including characters used to specify the part of speech and grammatical information.

2. The method of claim 1 wherein the part of speech and grammatical information portion of the stored sequence of characters is encoded by standard computer code.

3. The method of claim 1 wherein the part of speech and grammatical information is encoded by use of symbols representing an address of such information stored in another portion of the memory of the device.

4. The method of claim 1 wherein the part of speech and grammatical information is encoded as an index in a table of such information.

5. The method of claim 1 including the step of storing the sequence of characters in a predetermined order.

6. The method of claim 1 including wherein the sequence uses a separator character between the part of speech and grammatical information.

7. The method of claim 1 wherein said stored sequence includes a character for signifying that no such form of a word exists.

8. The method of claim 1 including repeating said sequence of steps for a multiplicity of words in a first language and a multiplicity of words in a second language.

9. The method of claim 1 including the step of using said stored information for providing inflection information for a given word.

10. The method of claim 8 including using said stored information for providing inflection information for a given word in said first language and in said second language.

11. The method of claim 1 wherein the predetermined manner of the arrangement for storing information representing the stem portion of a word is in a form of a directed acyclic word graph (DAWG).

12. The method of claim 11 including using said stored information for providing inflection information by first performing a depth-first search of the DAWG to determine whether a given path string of letter information is in the DAWG.

13. The method of claim 11 including using said stored information for providing inflection information by first performing a depth-first search of the DAWG to determine whether a given word is in the DAWG.

14. In a method of storage of separately encoded streams of Huffman symbols, the improvement comprising the step of merging elements of said separate streams into a single stream having a certain order in which said order of said symbols depends on a logical order in which said symbols, when decoded, are to be displayed.

15. The method of claim 14 also including the step of decoding the merged stream wherein an appropriate table for decoding a given symbol is determined from a context of the given symbol as encoded.

16. The method of claim 14 wherein one of the separately encoded streams of symbols is a stream of numbers representing stems of words and another separately encoded stream is a stream of numbers representing the ending of these words.

17. The method of claim 14 including an encoded stream representing formatting and/or syntactic information.

18. An electronic reference device for providing inflection information related to a given word comprising:

means for providing information signals representing all inflected forms of a word which are to be considered, said inflected forms including allowed endings of said word;

means for forming information signals representing a stem portion of said word consisting of a prefix which is longest and is the same in all of said forms of the word;

means for forming information signals representing a list of all allowed endings, designated as ending sets, of said forms of the word;

means for assigning a signal representing a unique number to each ending set;

means for storing information signals representing the stem portion of the word in a memory portion arranged in a predetermined manner; and means, responsive to said assigning means, for storing information signals representing a sequence of characters in a memory portion corresponding to each ending set number followed by a termination character, said sequence including characters used to specify the part of speech and grammatical information.

* * * * *